(12) United States Patent
Yu et al.

(10) Patent No.: US 8,817,460 B2
(45) Date of Patent: Aug. 26, 2014

(54) BRACKET OF ELECTRONIC DEVICE, DRAW SET ASSEMBLY OF ELECTRONIC DEVICE, AND COMPUTER CASE

(75) Inventors: Shu-Ming Yu, New Taipei (TW);
Fu-Jen Yang, New Taipei (TW);
Wei-Chen Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 214 days.

(21) Appl. No.: 13/414,296

(22) Filed: Mar. 7, 2012

(65) Prior Publication Data

US 2013/0127310 A1    May 23, 2013

(30) Foreign Application Priority Data

Nov. 21, 2011    (TW) .............................. 100142616 A

(51) Int. Cl.
*G06F 1/16* (2006.01)
*G11B 33/12* (2006.01)
*G06F 1/18* (2006.01)

(52) U.S. Cl.
CPC ............ *G11B 33/128* (2013.01); *G11B 33/124* (2013.01); *G06F 1/187* (2013.01)
USPC ............ 361/679.33; 361/679.37; 361/679.39; 361/727; 312/223.1; 312/223.2

(58) Field of Classification Search
CPC ....................................................... G06F 1/187
USPC ........................................ 361/679.37, 679.39
See application file for complete search history.

(56) References Cited

U.S. PATENT DOCUMENTS

| 7,483,268 | B1 * | 1/2009 | King et al. ................. 361/679.38 |
| 7,639,490 | B2 * | 12/2009 | Qin et al. .................. 361/679.34 |
| 8,310,827 | B2 * | 11/2012 | Huang et al. .............. 361/679.37 |
| 2003/0200630 | A1 * | 10/2003 | Feldmeyer ....................... 16/422 |
| 2008/0089021 | A1 * | 4/2008 | Deng et al. ...................... 361/685 |
| 2008/0298005 | A1 * | 12/2008 | Deng et al. ...................... 361/684 |
| 2011/0019357 | A1 * | 1/2011 | Lin et al. .................. 361/679.39 |
| 2011/0073734 | A1 | 3/2011 | Chang |
| 2012/0104222 | A1 * | 5/2012 | Ding ............................. 248/634 |

FOREIGN PATENT DOCUMENTS

| TW | M369006 U | 11/2009 |
| TW | M372059 | 1/2010 |

OTHER PUBLICATIONS

Taiwan Patent Office, Office Action, Patent Application Serial No. TW100142616, Oct. 17, 2013, Taiwan.

* cited by examiner

*Primary Examiner* — Anthony Q Edwards
(74) *Attorney, Agent, or Firm* — Rabin & Berdo, P.C.

(57) ABSTRACT

A bracket is used for an electronic device into a frame. The frame includes two opposite wall surfaces and at least one pair of guiding rails disposed on the two wall surfaces. The bracket includes a main connection portion, two main elastic arms, and main engaging posts. The main elastic arms respectively extend from two ends of the main connection portion. The two main elastic arms extend towards the same direction with a clamping space defined between the two main elastic arms for accommodating the electronic device. The main engaging posts are respectively disposed on sides of the two main elastic arms facing each other, so that the main engaging posts extend towards the clamping space for engaging lateral surfaces of the electronic device. The two main elastic arms respectively slide along the two guiding rails, so as to fix the electronic device into the frame.

20 Claims, 7 Drawing Sheets

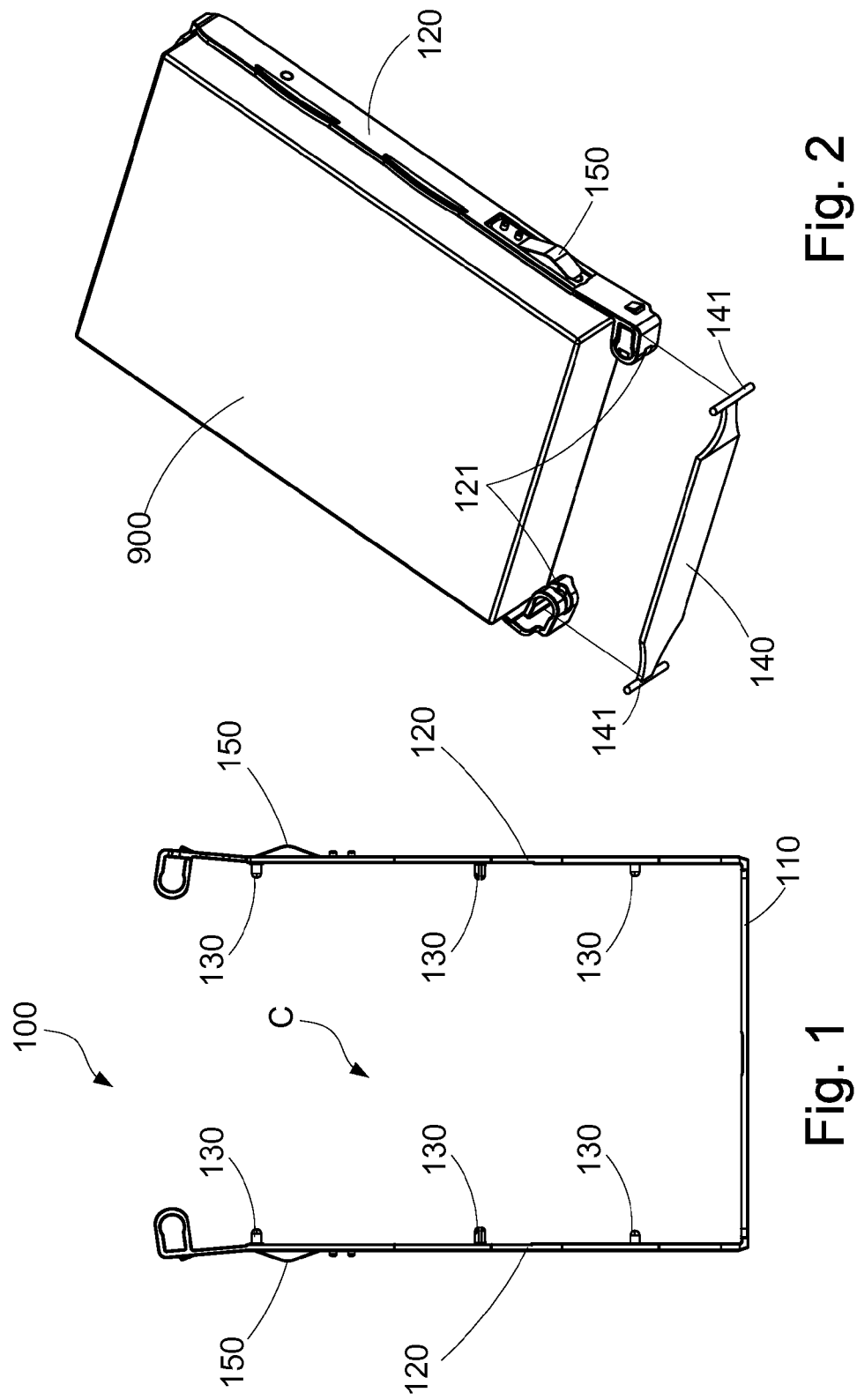

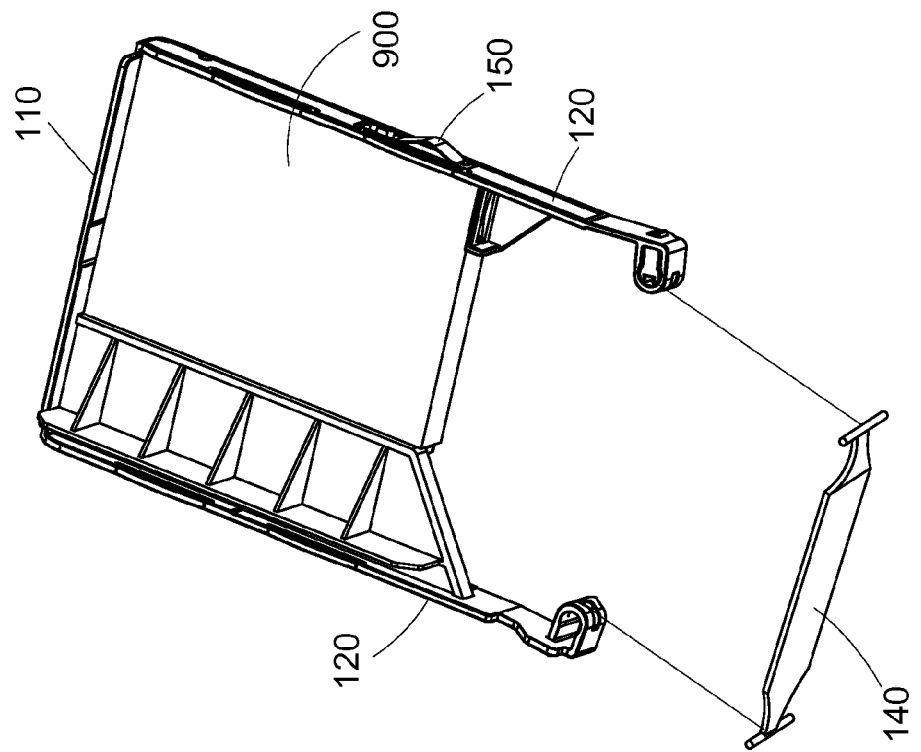
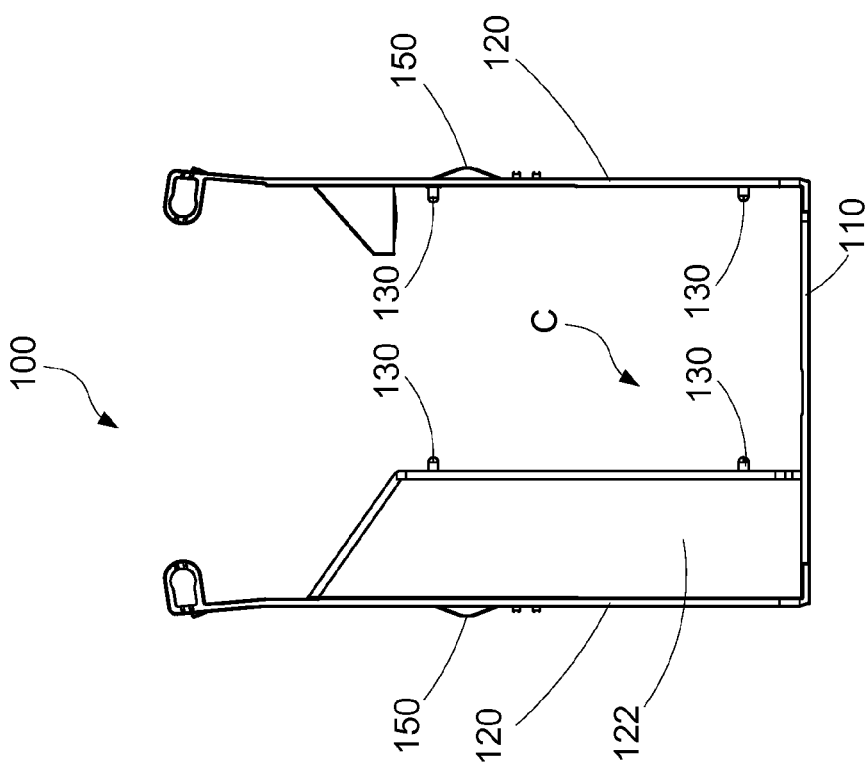
Fig. 5
Fig. 4

US 8,817,460 B2

BRACKET OF ELECTRONIC DEVICE, DRAW SET ASSEMBLY OF ELECTRONIC DEVICE, AND COMPUTER CASE

CROSS-REFERENCES TO RELATED APPLICATIONS

This non-provisional application claims priority under 35 U.S.C. §119(a) on Patent Application No. 100142616 filed in Taiwan, R.O.C. on 2011/11/21, the entire contents of which are hereby incorporated by reference.

BACKGROUND OF THE INVENTION

1. Technical Field

The disclosure relates to bracket of an electronic device, and more particularly to a bracket, a draw assembly set, and a computer case capable of quickly detaching and mounting an electronic device.

2. Related Art

A computer case is configured with a hard disk frame for fixing a hard disk, a floppy drive or an optical disk drive therein. Common hard disk frames include a specification matching a 5.25 inch hard disk/optical disk drive and a specification matching a 3.5 inch hard disk/floppy drive. If the specification is correct, the hard disk, floppy drive or optical disk drive may be directly placed into the hard disk frame, and then secured to the hard disk frame by screws.

If the specification is incorrect, a small size hard disk (for example, 2.5 inch hard disk), may also be adapted into a hard disk frame for a large size hard disk (for example, 3.5 inch hard disk), through an adapter frame. The adapter frame has to be fastened to lateral surfaces of the small size hard disk by screws at first, and then further fixed to the hard disk frame, thus fixing the small size hard disk.

This hard disk fixing manner requires use of a tool to drive screws in order to fix the adapter frame to the hard disk and fix the adapter frame to the frame, and as the process involves a large amount of screw fastening operations, the hard disk, floppy drive or optical disk drive is not easily detached or mounted. Especially for occasions requiring hot plugging of hard disks, such as in a server host, the above design is not suitable for hot plugging.

In view of the above problem, a bracket using a draw structure instead of the conventional adapter frame is provided in the prior art, for example, US Patent Publication No. 2011/0073734 provides an electronic device bracket, which can be combined quickly with lateral surfaces of an electronic device, and in addition fix the electronic device into the hard disk frame.

As described above, hard disks include specifications of 1.8 inches, 2.5 inches, 3.5 inches and 5.25 inches. A hard disk frame of a desktop computer or a server host generally has a specification capable of accommodating 3.5 inch hard disks, but applicable hard disks also include 2.5 inch hard disks in fact. A space for accommodating a 3.5 inch hard disk is sufficient for placing two 2.5 inch hard disks. However, as the design of the adapter frame is a fixing mechanism matching 3.5 inch hard disks, the space eventually can only accommodate one 2.5 inch hard disk. In other words, although the 2.5 inch hard disk has a smaller volume than the 3.5 inch hard disk, one 3.5 inch hard disk only can be replaced with one 2.5 inch hard disk, so that the number of hard disks cannot be increased by replacing small size hard disks.

SUMMARY

In view of the above problems, this disclosure is directed to a bracket, a draw assembly set, and a computer case, which has a simple structure and are easy to operate.

This disclosure provides a bracket, for fixing an electronic device therein, and in addition fixing the electronic device to a frame. The frame includes two opposite wall surfaces and at least one pair of guiding rails, and the two guiding rails are respectively disposed on the two wall surfaces. The bracket includes a main connection portion, two main elastic arms and a plurality of main engaging posts.

The two main elastic arms respectively extend from two ends of the main connection portion. The two main elastic arms extend towards the same direction and parallel to each other, and a clamping space is defined between the two main elastic arms for accommodating the electronic device.

The main engaging posts are respectively disposed on sides of the two main elastic arms facing each other, so that the main engaging posts extend towards the clamping space and engages into lateral surfaces of the electronic device, so as to fix the electronic device between the two main elastic arms. The two main elastic arms are provided for sliding along the two guiding rails respectively, so as to fix the electronic device into the frame.

This disclosure also provides a computer case, for accommodating at least one electronic device therein. The computer case includes a case body, at least one frame and at least one bracket.

In the bracket, the main elastic arms can deform to depart from each other under a small force, so that the electronic device is quickly fixed into the bracket, and in addition the electronic device is quickly fixed into the frame. In such a process, the electronic device can be mounted or detached quickly without using any tool.

This disclosure further provides draw set assembly, for fixing one or more electronic devices therein, and in addition fixing the electronic device to a frame. The draw set assembly includes an adapter member, and a bracket.

The adapter member includes a connecting plate and two lateral racks. The two lateral racks are connected to each other through the connecting plate, so that an accommodating space is defined between the two lateral racks to fix the electronic device therein, and a plurality of positioning holes is formed in an outer surface of each lateral rack.

The bracket includes a main connection portion, two main elastic arms and a plurality of main engaging posts. The two main elastic arms respectively extend from two ends of the main connection portion, and the two main elastic arms extend towards the same direction and parallel to each other.

The main engaging posts are respectively disposed on sides of the two main elastic arms facing each other, so that the main engaging posts extend towards the clamping space for engaging into the positioning holes of the adapter member to clamp the adapter member between the two main elastic arms.

The two main elastic arms are provided for sliding along the two guiding rails respectively, so as to fix the adapter member and the electronic device into the frame.

In the draw set assembly, the electronic device can be mounted or detached quickly without using any tool. Additionally, through the configuration of the draw set assembly and in combination with small size electronic devices (for example, replacing 3.5 inch hard disks with 2.5 inch hard disks), the draw set assembly can increase the number of electronic devices accommodated.

BRIEF DESCRIPTION OF THE DRAWINGS

The present invention will become more fully understood from the detailed description given herein below for illustration only, and thus not limitative of the present invention, wherein:

FIG. 1 is a top view of a bracket according to a first embodiment;

FIG. 2 is a three-dimensional view of the bracket according to the first embodiment;

FIG. 4 is a top view of a bracket according to a second embodiment;

FIG. 5 is a three-dimensional view of the bracket according to the second embodiment;

DETAILED DESCRIPTION

Figure 3:
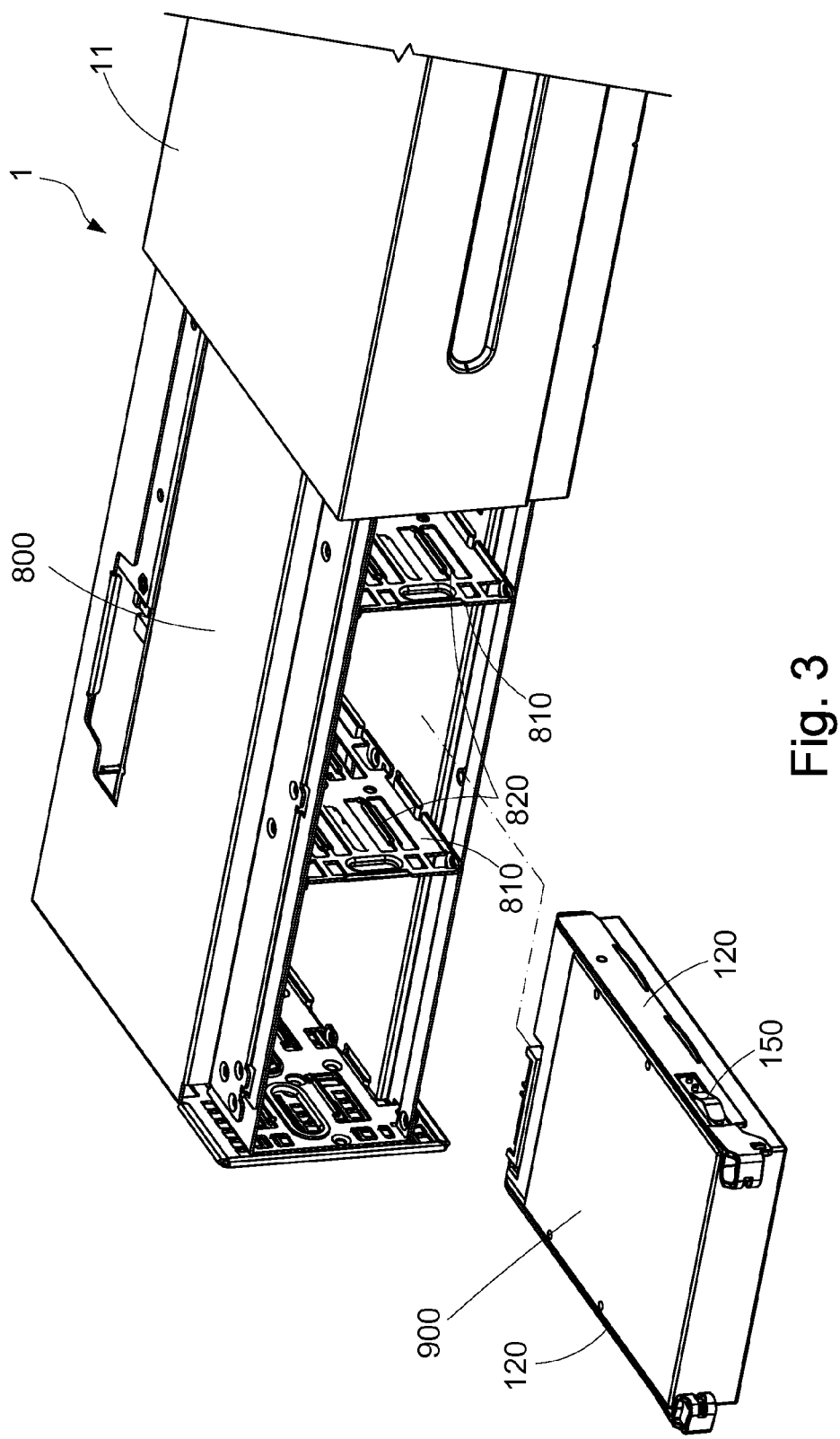
FIG. 3 is a three-dimensional view of a computer case according to the first embodiment.

Please refer to FIG. 1, FIG. 2 and FIG. 3, in which a bracket 100 according to a first embodiment is used for fixing an electronic device 900 therein. The electronic device 900 may be, but is not limited to, a hard disk or a removable medium reading device, and this disclosure is illustrated by taking a hard disk as an example. The bracket 100 includes a main connection portion 110, two main elastic arms 120, a plurality of main engaging posts 130 and a main latching member 140.

As shown in FIG. 1, the main connection portion 110 and the two main elastic arms 120 are integrally formed, and are made of an elastic material. The two main elastic arms 120 respectively extend from two ends of the main connection portion 110, and the two main elastic arms 120 extend towards the same direction and parallel to each other, and a clamping space C is defined between the two main elastic arms 120 for accommodating the electronic device 900 and clamping the electronic device 900 between the two main elastic arms 120. A spacing distance between the two main elastic arms 120 in an unstressed state is equal to or smaller than the width of the electronic device 900. When the two main elastic arms 120 receive a force and are subjected to a bending movement causing the two main elastic arms 120 to depart from each other, the electronic device 900 can be placed between the two main elastic arms 120.

Please refer to FIG. 1 and FIG. 2, in which the main engaging posts 130 are respectively disposed on sides of the two main elastic arms 120 facing each other, so that the main engaging posts 130 extend towards the clamping space C. The main engaging posts 130 are arranged on the main elastic arms 120 at intervals. In one specific example, three main engaging posts 130 are disposed on each main elastic arm 120, and relative positions of the main engaging posts 130 match relative positions of locking holes at lateral surfaces of the hard disk. However, as the electronic device 900 described in the embodiments is not limited to the hard disk, the relative positions of the main engaging posts 130 may also be otherwise configured, so that the main engaging posts 130 engages into lateral surfaces of the electronic device 900 to fix the electronic device 900 between the two main elastic arms 120.

As shown in FIG. 1 and FIG. 2, the two main elastic arms 120 may be bent outwards respectively to place the electronic device 900 between the two main elastic arms 120, so that the two main elastic arms 120 respectively contact two lateral surfaces of the electronic device 900. The main engaging posts 130 of each main elastic arm 120 are provided for engaging into the lateral surface of the electronic device 900.

In an example that the electronic device 900 is a hard disk, the main engaging posts 130 engages into screw holes of the hard disk.

Please refer to FIG. 2, in which the end of each main elastic arm 120 is formed with a main latched hole 121. Two ends of the main latching member 140 are respectively formed with a main latch 141 for engaging into the main latched hole 121, so as to connect ends of the two main elastic arms 120; therefore the ends of the two main elastic arms 120 do not depart from each other. Consequently, when the two main elastic arms 120 clamp the electronic device 900, and the main engaging posts 130 engages into the lateral surfaces of the electronic device 900, the main latching member 140 ensures that the ends of the two main elastic arms 120 do not depart from each other, so as to maintain the state that the main engaging posts 130 engages into the lateral surfaces of the electronic device 900.

As shown in FIG. 3, the bracket 100 is used for fixing the electronic device 900 into a frame 800. The frame 800 has two opposite wall surfaces 810 and at least one pair of guiding rails 820. The two guiding rails 820 are respectively disposed on the two wall surfaces 810. A relative distance between the two guiding rails 820 is slightly larger than the width of the electronic device 900, and matches a relative distance between the two main elastic arms 120. The two main elastic arms 120 are capable of sliding along the two guiding rails 820 respectively, so as to fix the electronic device 900 into the frame 800.

Additionally, when the two main elastic arms 120 respectively slide along the two guiding rails 820, the frame 800 restricts movement of the two main elastic arms 120, so that the two main elastic arms 120 does not deform to depart from each other, and the state that the main engaging posts 130 engage into the lateral surfaces of the electronic device 900 is maintained. The main latching member 140 may therefore be omitted.

As shown in FIG. 1, FIG. 2 and FIG. 3, the bracket 100 further includes at least one elastic positioning member 150, for example, a bent reed disposed on an outer surface of one of the two main elastic arms 120. In a specific example, the bracket 100 includes two elastic positioning members 150, respectively disposed on the outer surfaces of the two main elastic arms 120. The elastic positioning members 150 can press against the guiding rails 820 to fix the bracket 100, so as to prevent the electronic device 900 and the bracket 100 from sliding in the frame 800. In a specific example, the guiding rail 820 is formed with a trough for embedding the elastic positioning member 150.

In the first embodiment, the main elastic arms 120 can deform to depart from each other under a small force, so that the electronic device 900 is quickly fixed into the bracket 100, and in addition the electronic device 900 is quickly fixed into the frame 800, or the electronic device 900 is quickly detached from the frame 800. In such a process, the electronic device 900 can be mounted or detached quickly without using any tool.

Please refer to FIG. 4 and FIG. 5, in which a bracket 100 according to a second embodiment is used for fixing an electronic device 900 therein. The bracket 100 includes a main connection portion 110, two main elastic arms 120, a plurality of main engaging posts 130, a main latching member 140, and at least one elastic positioning member 150.

In the second embodiment, one of the two main elastic arms 120 further includes an extending portion 122 extending towards the clamping space C to reduce a spacing distance between the two main elastic arms 120 in an unstressed state, so as to match an electronic device 900 having a small width.

The main engaging posts 130 disposed on the main elastic arm 120 are located at the extending portion 122.

In a specific example, the electronic device 900 is a 2.5 inch hard disk, and the frame 800 matches a 3.5 inch hard disk. The width of an external periphery of the two main elastic arms 120 is set to match the frame 800, and the width of the clamping space C matches the 2.5 inch hard disk. Therefore, the bracket 100 can fix the 2.5 inch hard disk therein, and in addition fix the 2.5 inch hard disk into the frame 800 matching the 3.5 inch hard disk. Furthermore, the bracket 100 of the second embodiment is used for fixing an electronic device 900 having a small width into a frame 800 having a large width.

Please refer to FIG. 3, in which based on the first embodiment and the second embodiment, this disclosure further provides a computer case 1, including a case body 11, a plurality of frames 800 and a plurality of brackets 100. The frames 800 are disposed in the case body 11; in a specific example, the frames 800 are disposed independent of one another; in another specific example, the plurality of frames 800 is integrated. The brackets 100 are used for clamping a plurality of electronic devices 900, and in addition fixing the electronic devices 900 into the frames 800.

Figure 6:
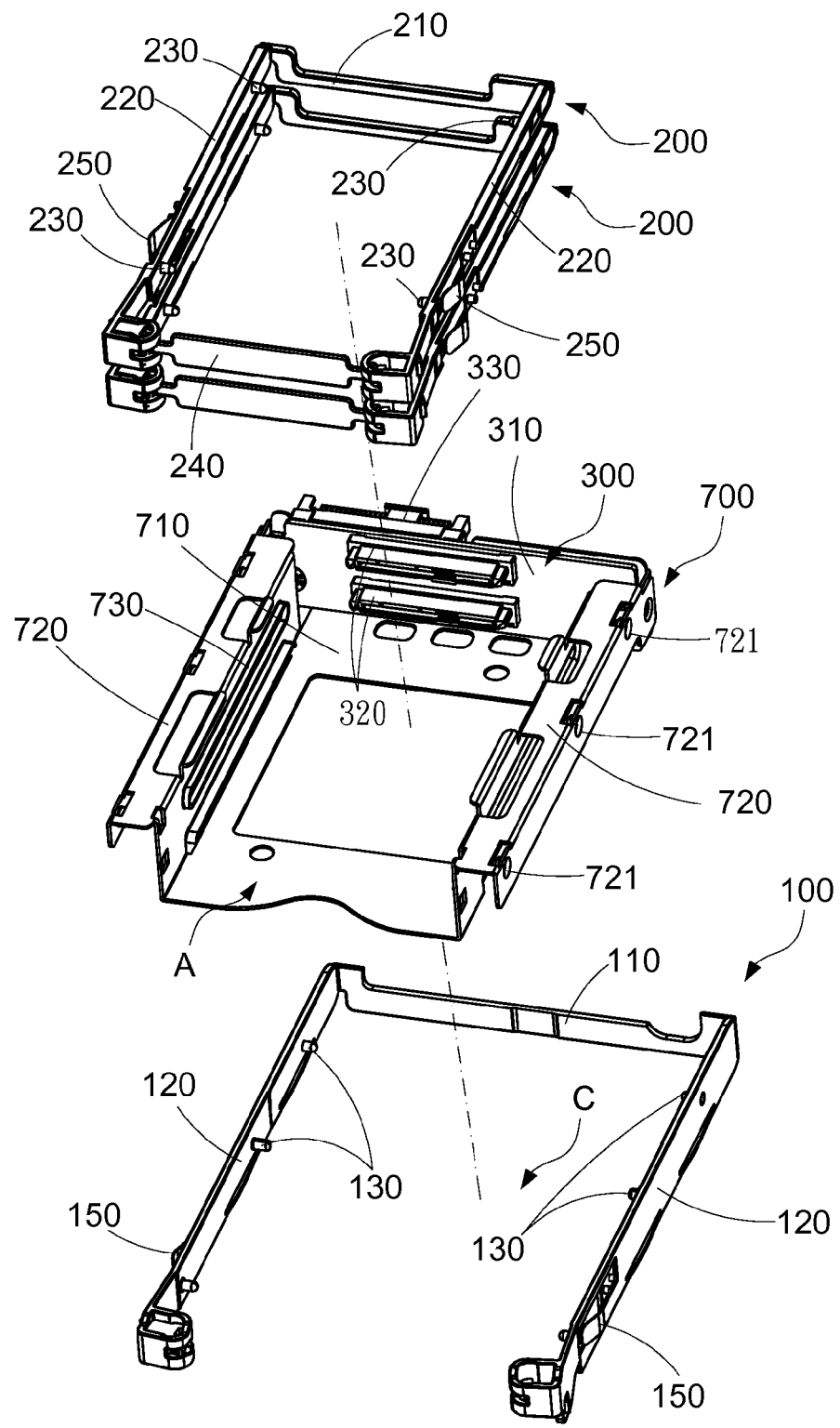
FIG. 6 is an exploded view of a draw set assembly according to a third embodiment.
Figure 7:
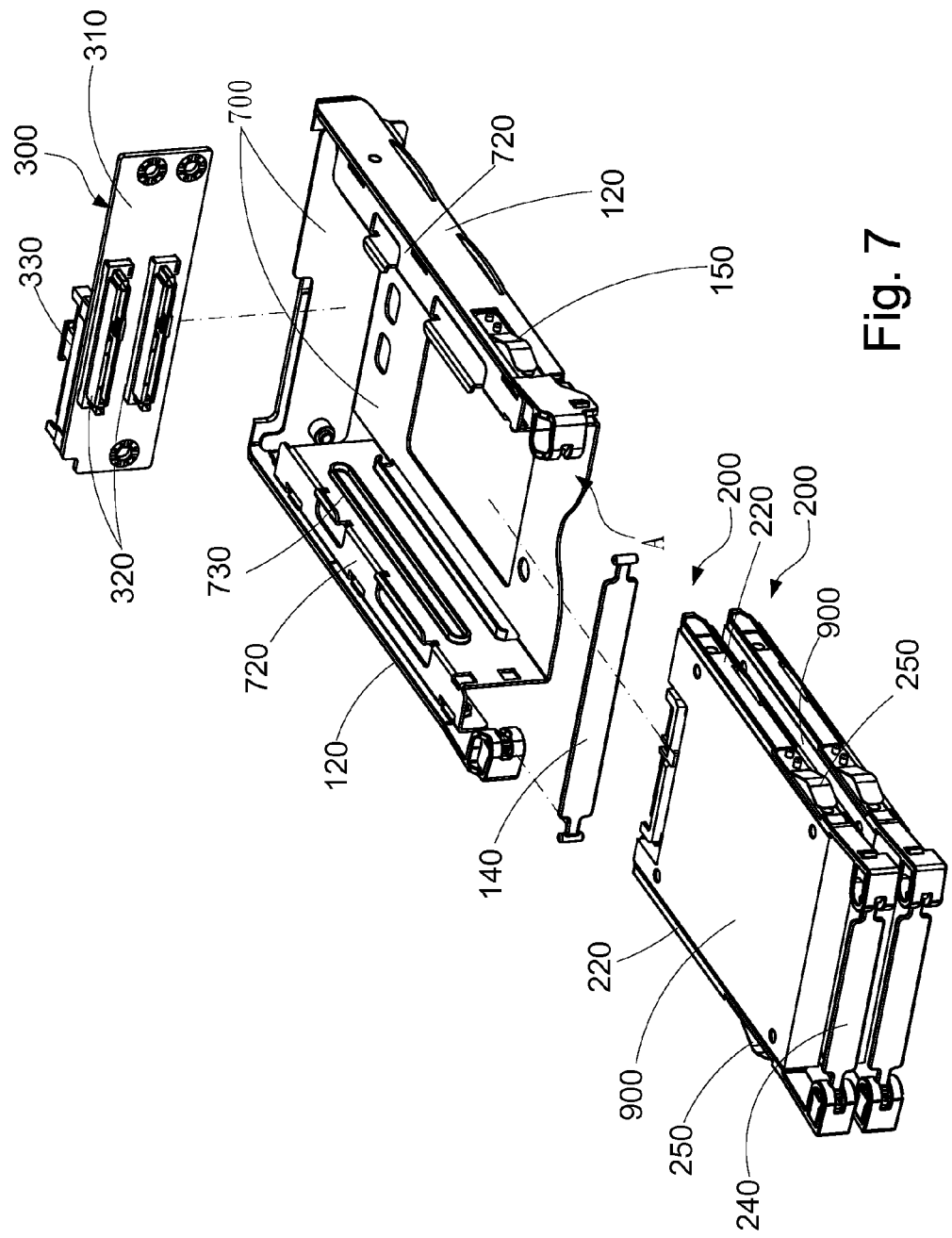
FIG. 7 is a partially exploded view of the draw set assembly according to the third embodiment.
Figure 8:
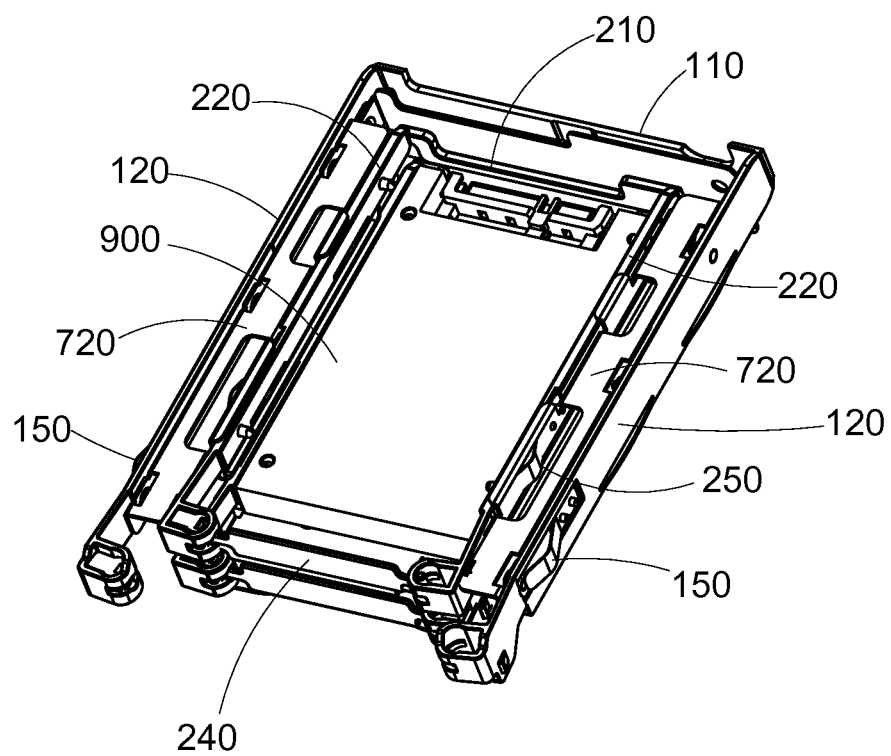
FIG. 8 is a three-dimensional view of the draw set assembly according to the third embodiment.

Please refer to FIG. 6, FIG. 7 and FIG. 8, in which a draw set assembly disclosed in a third embodiment is used for fixing one or more electronic devices 900 therein, and in addition fixing the electronic device 900 to a frame 800. The draw set assembly includes an adapter member 700 and a bracket 100.

The adapter member 700 includes a plurality of connecting plates 710 and two lateral racks 720. The two lateral racks 720 are connected to each other through the connecting plates 710, so that an accommodating space A is defined between the two lateral racks 720 to fix the electronic device 900 therein, and a plurality of positioning holes 721 is formed in an outer surface of each lateral rack 720.

The bracket 100 is basically the same as that disclosed in the first embodiment, and includes a main connection portion 110, two main elastic arms 120, a plurality of main engaging posts 130, a main latching member 140, and at least one elastic positioning member 150. A spacing distance between the two main elastic arms 120 in an unstressed state is just equal to the width of the adapter member 700. The two main elastic arms 120 may be bent outwards respectively to place the adapter member 700 between the two main elastic arms 120, so that the two main elastic arms 120 contact the two lateral racks 720. The main engaging posts 130 of each main elastic arm 120 engage into the positioning holes 721 of the lateral rack 720 to clamp the adapter member 700 between the two main elastic arms 120.

To fix the electronic device 900 into the adapter member 700 quickly, the draw set assembly further includes a plurality of auxiliary brackets 200. Each auxiliary bracket 200 includes an auxiliary connection portion 210, two auxiliary elastic arms 220, a plurality of auxiliary engaging posts 230, an auxiliary latching member 240, and at least one auxiliary positioning member 250. The two auxiliary elastic arms 220 respectively extend from two ends of the auxiliary connection portion 210, and the two auxiliary elastic arms 220 extend towards the same direction and parallel to each other. The auxiliary engaging posts 230 are respectively disposed on sides of the two auxiliary elastic arms 220 facing each other for engaging into lateral surfaces of the electronic device 900 to fix the electronic device 900 between the two auxiliary elastic arms 220. The auxiliary latching member 240 is used for connecting two ends of the two auxiliary elastic arms 220.

The auxiliary positioning member 250 is disposed on an outer surface of one of the two auxiliary elastic arms 220.

The structure of the auxiliary bracket 200 is the same as that of the bracket 100, except that the size of the auxiliary bracket 200 is smaller than the bracket 100, so as to match an electronic device 900 having a small size.

The adapter member 700 includes a plurality of pairs of auxiliary guiding rails 730. Each pair of auxiliary guiding rails 730 are respectively disposed on the two lateral racks 720 and located in the accommodating space A. Each auxiliary bracket 200 is used for fixing an electronic device 900 therein, and sliding between one pair of auxiliary guiding rails 730, to fix the electronic device 900 into the adapter member 700. In a specific example, the adapter member 700 includes two auxiliary guiding rails 730, corresponding to two electronic devices 900.

In each pair of auxiliary guiding rails 730, a relative distance between the auxiliary guiding rails 730 is slightly larger than the width of the electronic device 900, and matches a relative distance between the two auxiliary elastic arms 220. The auxiliary elastic arms 220 are provided for sliding along the two auxiliary guiding rails 730 respectively, so as to fix the electronic device 900 into the adapter member 700.

In an example that the electronic device 900 is a hard disk, the width of the adapter member 700 is equal to the width of a 3.5 inch hard disk, and relative positions of the positioning holes 721 are the same as relative positions of locking holes of the 3.5 inch hard disk. Consequently, the two main elastic arms 120 can slide into the guiding rails 820 of the frame 800 to fix the adapter member 700 into the frame 800 corresponding to the 3.5 inch hard disk. The accommodating space A of the frame 800 can accommodate a small electronic device 900, for example, a 2.5 inch hard disk, and the accommodating space A may accommodate two or more 2.5 inch hard disks. As the thickness of the 3.5 inch hard disk is generally larger than twice the thickness of the 2.5 inch hard disk, a space for accommodating one 3.5 inch hard disk may substantially accommodate two 2.5 inch hard disks through the adapter member 700.

As shown in FIG. 6 and FIG. 7, the draw set assembly further includes an adapter circuit board 300. The adapter circuit board 300 includes a substrate 310, a plurality of first electrical connector 320 with first standard properties and a second electrical connector 330 with second standard properties.

The substrate 310 is disposed between the two lateral racks 720, and disposed perpendicular to a sliding direction of the electronic device 900. The first electrical connector 320 is disposed on a lateral surface of the substrate 310 and faces towards the accommodating space A, and used for connecting the electronic device 900. The second electrical connector 330 is disposed on another lateral surface of the substrate 310 and faces towards outside of the adapter member 700.

The first electrical connector 320 is electrically connected to the second electrical connector 330, so as to electrically connect the electronic device 900 to the second electrical connector 330. After the electronic devices 900 are placed into the accommodating space A through the combination of the auxiliary brackets 200 and the auxiliary guiding rails 730, the first electrical connector 320 is connected to the electronic devices 900 respectively, so as to connect the electronic devices 900 to the second electrical connector 330. The second electrical connector 330 may further be connected to a connector disposed the frame 800.

In an example that the electronic device 900 is a hard disk, the first electrical connector 320 is a bus coupler for a 2.5 inch hard disk, and the second electrical connector 330 is a bus coupler for a 3.5 inch hard disk. The first electrical connector 320 adapts two 2.5 inch hard disks to one second electrical connector 330, which is further connected to a signal connector (standard size IDE slot, SCSI slot or SATA slot) for a 3.5 inch hard disk.

Figure 9:
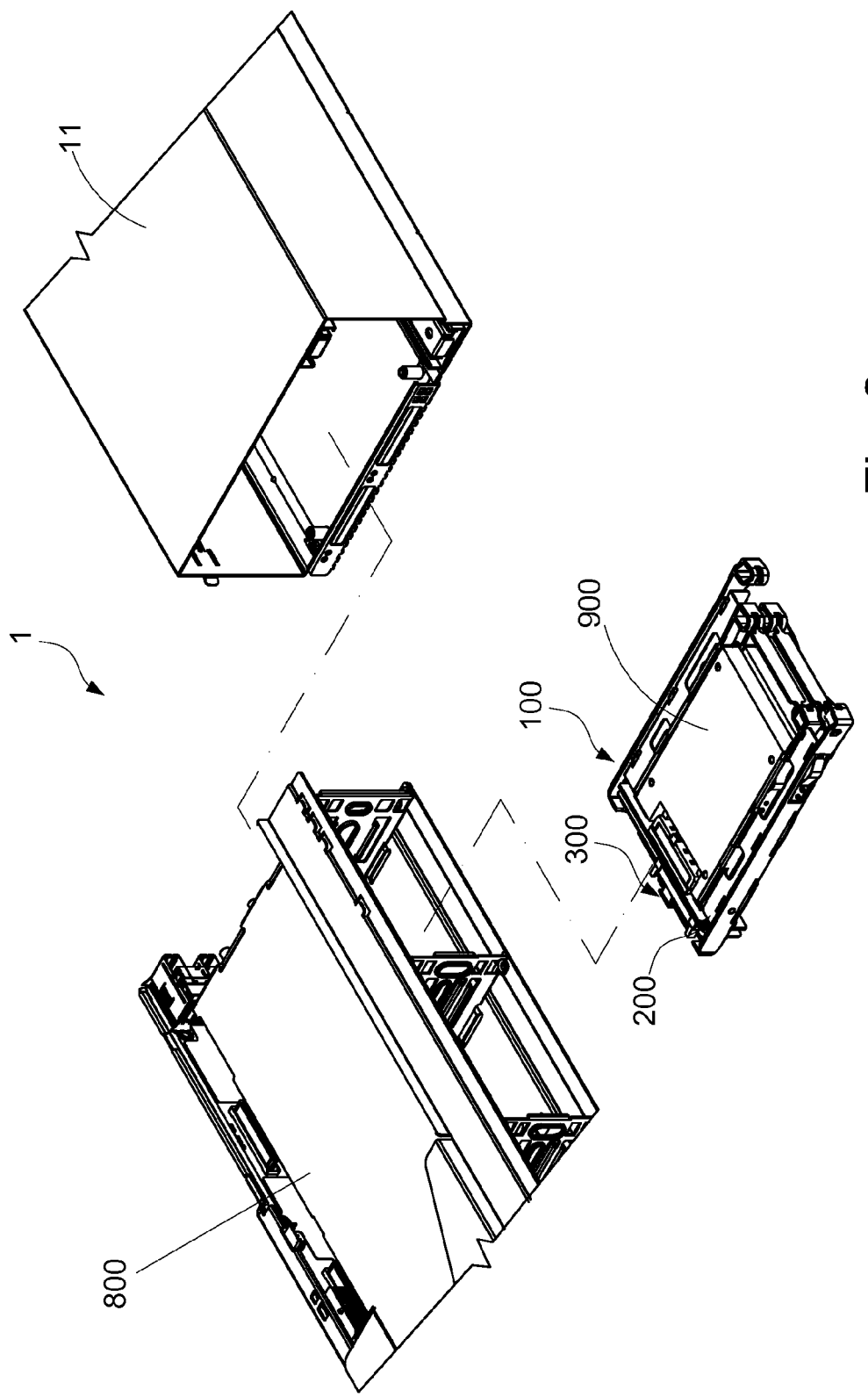
FIG. 9 is a three-dimensional view of a computer case according to the third embodiment.

As shown in FIG. 9, based on the third embodiment, this disclosure further provides a computer case 1, including a case body 11, a plurality of frames 800 and a plurality of draw set assembly. The frames 800 are disposed in the case body 11; in a specific example, the frames 800 are disposed independent of one another; in another specific example, the plurality of frames 800 is integrated. The draw set assemblies accommodate electronic devices 900, and in addition fix the electronic devices 900 into the frames 800.

Through the configuration of the draw set assemblies, the third embodiment increases the number of electronic devices 900 accommodated. For example, when 2.5 inch hard disks are used to replace 3.5 inch hard disks, the number of 2.5 inch hard disks that can be mounted in the draw set assembly will be twice the original number of 3.5 inch hard disks, thereby reducing the waste of space in the frames 800. In addition, as the draw set assemblies of this disclosure facilitates quick detachment and mounting of the electronic device 900 without requiring any tool for assistance, the draw set assemblies of this disclosure facilitate hot plugging of the electronic device 900.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A bracket for fixing an electronic device therein and further fixing the electronic device into a frame, wherein the frame comprises two opposite wall surfaces and at least one pair of guiding rails, and the at least one pair of guiding rails are respectively disposed on the two wall surfaces, the bracket comprising:
   a main connection portion;
   two main elastic arms, respectively extending from two ends of the main connection portion, wherein the two main elastic arms extend towards a same direction and parallel to each other, and a clamping space is defined between the two main elastic arms for accommodating the electronic device; and
   a plurality of main engaging posts, respectively disposed on sides of the two main elastic arms facing each other, so that the main engaging posts extend towards the clamping space for engaging lateral surfaces of the electronic device to fix the electronic device between the two main elastic arms,
   wherein the two main elastic arms are provided for sliding along the at least one pair of guiding rails respectively, so as to fix the electronic device into the frame,
   wherein one of the two main elastic arms further comprises an extending portion extending towards the clamping space, and one or more of the main engaging posts are disposed on the one of the main elastic arms and are located at the extending portion.

2. The bracket as claimed in claim 1, wherein the main connection portion and the two main elastic arms are integrally formed, and are made of an elastic material.

3. The bracket as claimed in claim 1, further comprising a main latching member, for being connected to ends of the two main elastic arms.

4. The bracket as claimed in claim 3, wherein each of said ends of the two main elastic arms is formed with a main latched hole and two ends of the main latching member are respectively formed with a main latch for engaging into the main latched holes.

5. The bracket as claimed in claim 4, further comprising at least one elastic positioning member disposed on an outer surface of one of the two main elastic arms.

6. A draw set assembly, for fixing one or more electronic devices therein, and further fixing the one or more electronic devices to a frame, wherein the frame comprises two opposite wall surfaces and at least one pair of guiding rails, and the at least one pair of guiding rails are respectively disposed on the two wall surfaces, the draw set assembly comprising:
   an adapter member, comprising at least one connecting plate and two lateral racks, wherein the two lateral racks are connected to each other through the at least one connecting plate, so that an accommodating space is defined between the two lateral racks to fix the one or more electronic devices therein, and a plurality of positioning holes is formed in an outer surface of each lateral rack; and
   a bracket, comprising:
      a main connection portion;
      two main elastic arms, respectively extending from two ends of the main connection portion, wherein the two main elastic arms extend towards a same direction and parallel to each other; and
      a plurality of main engaging posts, respectively disposed on sides of the two main elastic arms facing each other, so that the main engaging posts extend towards a clamping space for engaging into the positioning holes of the adapter member to clamp the adapter member between the two main elastic arms, wherein the two main elastic arms are provided for sliding along the at least one pair of guiding rails respectively, so as to fix the adapter member and the one or more electronic devices into the frame.

7. The draw set assembly as claimed in claim 6, further comprising a main latching member, for connecting ends of the two main elastic arms.

8. The draw set assembly as claimed in claim 7, wherein each of said ends of the main elastic arms is formed with a main latched hole, and two ends of the main latching member are respectively formed with a main latch for engaging into the main latched holes.

9. The draw set assembly as claimed in claim 8, further comprising at least one elastic positioning member, disposed on an outer surface of one of the two main elastic arms.

10. The draw set assembly as claimed in claim 6, wherein the adapter member comprises at least one pair of auxiliary guiding rails, respectively disposed on the two lateral racks and located in the accommodating space, and the draw set assembly further comprises at least one auxiliary bracket, for fixing the one or more electronic devices therein, and sliding between the at least one pair of auxiliary guiding rails to fix the one or more electronic devices into the adapter member.

11. The draw set assembly as claimed in claim 10, wherein the at least one auxiliary bracket comprises:
   an auxiliary connection portion;
   two auxiliary elastic arms, respectively extending from two ends of the auxiliary connection portion, wherein the two auxiliary elastic arms extend towards a same direction and parallel to each other; and a plurality of auxiliary engaging posts, respectively disposed on sides of the two auxiliary elastic arms facing each other for engaging lateral surfaces of the one or more electronic devices to fix the one or more electronic devices between the two auxiliary elastic arms, wherein the two auxiliary elastic arms are provided for sliding along the at least one pair of auxiliary guiding rails respectively, so as to fix the one or more electronic devices into the adapter member.

12. The draw set assembly as claimed in claim 11, wherein the at least one auxiliary bracket further comprises an auxiliary latching member for connecting to two ends of the two auxiliary elastic arms.

13. The draw set assembly as claimed in claim 12, wherein the at least one auxiliary bracket further comprises at least one auxiliary positioning member, disposed on an outer surface of one of the two auxiliary elastic arms.

14. The draw set assembly as claimed in claim 13, further comprising an adapter circuit board, comprising:
 a substrate, disposed between the two lateral racks, and disposed perpendicular to a sliding direction of the one or more electronic devices;
 at least one first electrical connector with first standard properties, disposed on a lateral surface of the substrate and facing towards the accommodating space, for connecting to the one or more electronic devices; and
 a second electrical connector with second standard properties, disposed on another lateral surface of the substrate and facing towards an outside of the adapter member, wherein the at least one first electrical connector is electrically connected to the second electrical connector.

15. A computer case, for accommodating at least one electronic device therein, the computer case comprising:
 a case body;
 at least one frame disposed in the case body, wherein the at least one frame comprises two opposite wall surfaces and at least one pair of guiding rails, and the at least one pair of guiding rails are respectively disposed on the two wall surfaces; and
 at least one bracket, comprising:
  a main connection portion;
  two main elastic arms, respectively extending from two ends of the main connection portion, wherein the two main elastic arms extend towards a same direction and parallel to each other, a clamping space is defined between the two main elastic arms for accommodating the at least one electronic device, and the two main elastic arms are provided for sliding along the at least one pair of guiding rails respectively, so as to fix the at least one electronic device into the at least one frame; and
  a plurality of main engaging posts, respectively disposed on sides of the two main elastic arms facing each other, so that the main engaging posts extend towards the clamping space,
  wherein one of the two main elastic arms further comprises an extending portion extending towards the clamping space to reduce a spacing distance between the two main elastic arms in an unstressed state, and one or more of the main engaging posts are disposed on the one of the main elastic arms and are located at the extending portion.

16. A computer case, for accommodating at least one electronic device therein, the computer case comprising:
 a case body;
 at least one frame disposed in the case body, wherein the at least one frame comprises two opposite wall surfaces and at least one pair of guiding rails, and the at least one pair of guiding rails are respectively disposed on the two wall surfaces;
 at least one bracket, comprising:
  a main connection portion;
  two main elastic arms, respectively extending from two ends of the main connection portion, wherein the two main elastic arms extend towards a same direction and parallel to each other, a clamping space is defined between the two main elastic arms for accommodating the at least one electronic device, and the two main elastic arms are provided for sliding along the at least one pair of guiding rails respectively, so as to fix the at least one electronic device into the at least one frame;
  a plurality of main engaging posts, respectively disposed on sides of the two main elastic arms facing each other, so that the main engaging posts extend towards the clamping space; and
 an adapter member, comprising at least one connecting plate and two lateral racks, wherein the two lateral racks are connected to each other through the at least one connecting plate, so that an accommodating space is defined between the two lateral racks to fix the at least one electronic device therein, and the two main elastic arms are provided for clamping the adapter member.

17. The computer case according to claim 16, wherein a plurality of positioning holes is formed in an outer surface of each of the lateral racks, the main engaging posts are provided for engaging into the positioning holes of the adapter member to clamp the adapter member between the two main elastic arms.

18. The computer case according to claim 16, wherein the adapter member comprises at least one pair of auxiliary guiding rails, respectively disposed on the two lateral racks and located in the accommodating space, and the computer case further comprises at least one auxiliary bracket, for fixing the at least one electronic device therein, and sliding between the at least one pair of auxiliary guiding rails, to fix the at least one electronic device into the adapter member.

19. The computer case according to claim 18, wherein the at least one auxiliary bracket comprises:
 an auxiliary connection portion;
 two auxiliary elastic arms, respectively extending from two ends of the auxiliary connection portion, wherein the two auxiliary elastic arms extend towards a same direction and parallel to each other; and
 a plurality of auxiliary engaging posts, respectively disposed on sides of the two auxiliary elastic arms to face each other, for engaging lateral surfaces of the at least one electronic device to fix the at least one electronic device between the two auxiliary elastic arms,
 wherein the two auxiliary elastic arms are capable of sliding along the at least one pair of auxiliary guiding rails respectively, so as to fix the at least one electronic device into the adapter member.

20. The computer case according to claim 19, further comprising an adapter circuit board, comprising:
 a substrate, disposed between the two lateral racks, and disposed perpendicular to a sliding direction of the at least one electronic device;
 at least one first electrical connector with first standard properties, disposed on a lateral surface of the substrate and facing towards the accommodating space, for connecting to the at least one electronic device; and
 a second electrical connector with second standard properties, disposed on another lateral surface of the substrate and facing towards an outside of the adapter member, wherein the at least one first electrical connector is electrically connected to the second electrical connector.

* * * * *